W. B. BULL.
APPARATUS FOR PURIFYING WATER.
APPLICATION FILED JUNE 6, 1910.
982,705.
Patented Jan. 24, 1911.
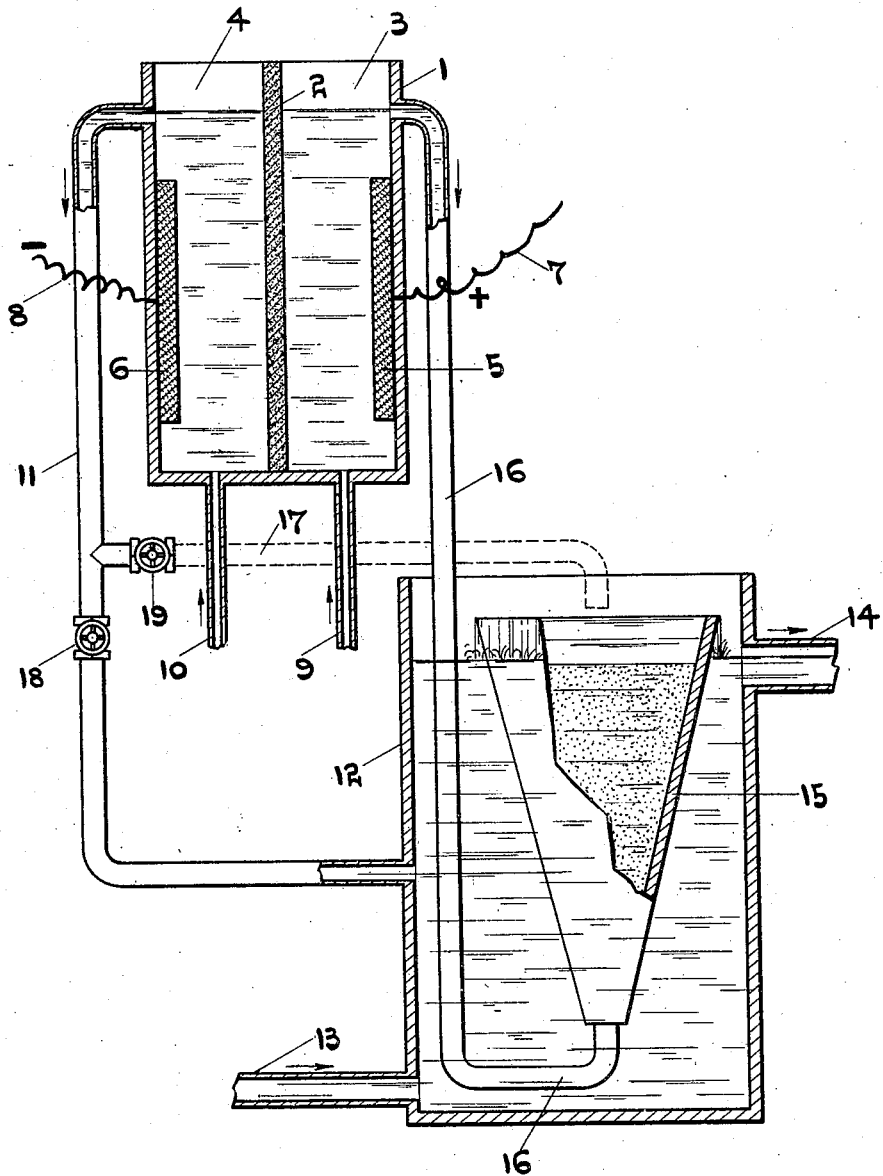

UNITED STATES PATENT OFFICE.

WILLIAM B. BULL, OF CHICAGO, ILLINOIS, ASSIGNOR TO CHLORIDE PROCESS COMPANY, OF CHICAGO, ILLINOIS, A CORPORATION OF ILLINOIS.

APPARATUS FOR PURIFYING WATER.

982,705.

Specification of Letters Patent. Patented Jan. 24, 1911.

Application filed June 6, 1910. Serial No. 565,314.

*To all whom it may concern:*

Be it known that I, WILLIAM B. BULL, a citizen of the United States, residing at Chicago, in the county of Cook and State of Illinois, have invented certain new and useful Improvements in Apparatus for Purifying Water, of which the following is a specification, reference being had to the accompanying drawings.

My invention relates to the purification of water for potable and other industrial uses, and it has particularly to do with the purification of water in large quantities by treating the water with a suitable coagulant adapted to agglomerate or cause a coalescence of the impurities in the water and afterward removing the coagulated matter by sedimentation or by filtration through a granular filter-bed.

The object of my invention is to provide an improved apparatus which will be peculiarly adapted for use in carrying out the process described and claimed in my application filed May 31, 1910, Serial No. 564,245. My said process, in the exemplification thereof given in said application, consists in forming a solution which is a solvent of iron, and a precipitant of chlorid of iron simultaneously by electrolysis, treating iron or its equivalent in a separate chamber with the solution so formed, thereby forming a solution of chlorid of iron, or equivalent solution, and then using such solution of chlorid of iron in the production of a coagulant either by combination with the precipitants naturally contained in the water or by its precipitation by the use of the pricipitant formed by the electrolytic process. In its best form said process contemplates the precipitation of the coagulant in the water to be purified, but if this is not done the precipitation of the coagulant should be effected so shortly before its introduction into the water to be purified that its agglomeration would take place in such water.

I accomplish the object of my present invention as illustrated in the drawings and as hereinafter described.

What I regard as new is set forth in the claims.

In the accompanying drawings, which illustrate a simple form of apparatus for practicing my said process, the figure is substantially a central vertical section.

Referring to the drawings,—1 indicates a suitable receptacle or cell, which is divided by a porous diaphragm 2 into anode and cathode chambers 3, 4.

5, 6 indicate electrodes of which the positive is of carbon or other suitable material inert chemically as regards chlorin, which are placed in the two compartments 3, 4, respectively, and are connected to conductors 7, 8 by which the electric current is supplied.

9, 10 indicate inlet pipes communicating, respectively, with the bottom of the chambers 3, 4.

A solution of common salt is placed in compartment 4 and the other compartment is filled with water which at the beginning of the operation may be acidulated, or otherwise treated, if desired, to increase its conductivity. With the passage of the electric current through the wires 7, 8 the electrode 5 becomes the anode and the electrode 6 the cathode of an electrolytic apparatus, the result being the decomposition of the common salt solution in the compartment 4, forming a solution of sodium hydrate therein and the formation of a solution containing chlorin in the compartment 3. While the operation is in progress the supply of water and sodium chlorid in the two compartments 3, 4, is maintained through pipes 9, 10.

11 indicates a pipe leading from the upper portion of compartment 4 to a tank 12 through which the water to be purified is passed, such water being admitted to the bottom of the tank through an inlet pipe 13.

14 indicates an outlet pipe communicating with the tank 12 near the upper portion thereof and at the opposite side from the inlet pipe 13 so that the water to be purified flows through said tank in an upward direction.

15 indicates a funnel-shaped receptacle, which is placed in the tank 12 and with its upper margin below the upper edge of said tank so that the overflow from the solution passing upward through such receptacle, as hereinafter described, is discharged into said tank. The receptacle 15 is adapted to contain comminuted iron or equivalent material, and is connected at its lower end by a pipe 16 with the upper portion of the chamber 3, the arrangement being such that the overflow from said chamber 3 passes down to the bottom of the receptacle 15 and then upward through said receptacle, overflowing its upper edge as illustrated in the drawings.

It will be apparent by this construction the solution formed in the chamber 3 will be conducted to the bottom of the receptacle 15 and will rise through the mass of iron in said receptacle, thereby thoroughly subjecting thereto the particles of iron therein. The result is the formation of a strong solution of chlorid of iron which is discharged into the water to be purified passing through the tank 12.

If the water to be purified does not contain sufficient free carbonic acid gas to interfere with the natural oxidation of the iron solution and prevent its precipitation as iron hydrate, the use of the sodium hydrate formed in chamber 4 as a precipitant is not necessary, but ordinarily it is desirable to use it, and in such case the solution of sodium hydrate may be conducted directly into the water to be purified through pipe 11, or, if preferred, the solution of sodium hydrate may be discharged into the upper portion of the receptacle 15 through a pipe 17 indicated by dotted lines in the drawings. In the latter arrangement the sodium hydrate is introduced directly into the solution of chlorid of iron before the latter is discharged into the water to be purified, but, as will be observed, such discharge will take place immediately after the introduction of the sodium hydrate into the chlorid of iron solution. Valves 18, 19 are provided for controlling the point of discharge of the sodium hydrate solution. In either case the agglomeration of the precipitated iron hydrate takes place in the water to be purified, thus enabling it to coagulate the impurities so that they may be readily removed by subsequent filtration or sedimentation.

I wish it to be understood that my invention is generic in character and that the claims hereinafter made are not to be restricted to the specific arrangement of the parts shown and described, except in so far as they are particularly claimed, but includes broadly the subject-matter of the generic claims. Furthermore, it is not restricted in its use to the practicing of the process hereinbefore described by the use of the materials mentioned.

The solution produced by the electrolytic action described is a solvent of iron and by its action upon the iron forms an iron salt solution which is precipitable as a hydroxid coagulant, such precipitation being in some cases effected by the action of the substances naturally contained in the water treated and in other cases by the addition of a suitable precipitant, such as the alkaline hydrate formed as hereinbefore described.

The term "chemically inert" as applied to the anode is used to indicate only that the anode is not chemically acted upon by the element liberated at the positive electrode, and does not mean that it must be made of a material that will resist chemical action in other situations.

That which I claim as my invention, and desire to secure by Letters Patent, is,—

1. An apparatus for purifying water, comprising electrolytic means, including a chemically inert anode, for producing a reagent adapted to act upon a suitable metal to form a soluble salt thereof capable of being precipitated to form a coagulant, a container separate from the anode chamber adapted to contain such metal, a receptacle for the water to be treated, and means for conducting the reagent to the metal and for introducing the unagglomerated coagulant produced therefrom into the water receptacle.

2. An apparatus for purifying water, comprising an electrolytic cell divided into anode and cathode chambers, a receptacle for the water to be treated, a container in said receptacle adapted to contain a suitable metal, said container being adapted to discharge into said water receptacle, and means for conducting the reagent formed in the anode chamber to the metal in said receptacle and for introducing the unagglomerated coagulant produced therefrom into the water to be purified.

3. An apparatus for purifying water, comprising electrolytic means, including a chemically inert anode, for separately producing a reagent adapted to act upon a suitable metal to form a soluble salt thereof capable of being precipitated to form a coagulant and a reagent adapted to effect such precipitation, a container separate from the anode chamber adapted to contain such metal, a receptacle for the water to be treated, and means for subjecting the metal to the action of the first-mentioned reagent and for introducing the unagglomerated coagulant obtained therefrom into the water to be purified.

4. An apparatus for purifying water, comprising electrolytic means, including a chemically inert anode, for separately producing a reagent adapted to act upon a suitable metal to form a soluble salt thereof capable of being precipitated to form a coagulant and a reagent adapted to effect such precipitation, a container separate from the anode chamber adapted to contain such metal, a receptacle for the water to be treated, means for subjecting the metal to the action of the first-mentioned reagent and for introducing the unagglomerated coagulant obtained therefrom into the water to be purified, and means for effecting the precipitation of the coagulant by the action of the second reagent.

5. An apparatus for purifying water, comprising a receptacle through which the water to be treated is conducted, a container separate from the anode chamber adapted to contain a suitable metal, electrolytic means, including a chemically inert anode, for separately forming a reagent adapted to act upon the metal to form a soluble compound capable of being precipitated in the form of a coagulant and a reagent adapted to effect the precipitation of such coagulant, and means for conducting such first-mentioned reagent through the metal container and introducing the resulting solution into the water to be purified.

6. An apparatus for purifying water, comprising a receptacle through which the water to be treated is conducted, a container adapted to contain a suitable metal, electrolytic means comprising a cell containing anode and cathode chambers, and a chemically inert anode in said anode chamber, for separately forming a reagent adapted to act upon the metal to form a soluble compound capable of being precipitated in the form of a coagulant and a reagent adapted to effect the precipitation of such coagulant, means for conducting such first-mentioned reagent through the metal container and introducing the resulting solution into the water to be purified, and means for conducting the other reagent to the water to be purified.

7. An apparatus for purifying water, comprising an electrolytic apparatus arranged to separately produce a solution containing a solvent of iron and an alkaline solution, a receptacle separate from the anode chamber adapted to contain a suitable metal, means for conducting the iron solvent through the metal, a receptacle for the water to be purified, said metal receptacle being adapted to discharge into said water receptacle, and means for subjecting the solution formed in said metal receptacle to the action of said alkaline solution.

8. An apparatus for purifying water, comprising an electrolytic apparatus arranged to separately produce a solution containing a solvent of iron and an alkaline solution, a receptacle separate from the anode chamber adapted to contain a suitable metal, means for conducting the iron solvent through the metal, a receptacle for the water to be purified, said metal receptacle being adapted to discharge into said water receptacle, and means for conducting the alkaline solution into the water receptacle.

9. An apparatus for purifying water, comprising an electrolytic apparatus arranged to separately produce a solution containing a solvent of iron and an alkaline solution, a receptacle separate from the anode chamber adapted to contain a suitable metal, means for conducting the iron solvent through the metal, and a receptacle for the water to be purified, said metal receptacle being adapted to discharge into said water receptacle.

10. An apparatus for purifying water, comprising means for containing the water to be purified, a receptacle adapted to contain iron and communicating with said water container, an electrolytic cell having anode and cathode chambers, a chemically inert anode in said anode chamber, and means for conducting the solution formed in said anode chamber to said iron containing receptacle.

11. An apparatus for purifying water, comprising means for containing the water to be purified, a receptacle adapted to contain iron and communicating with said water container, an electrolytic cell having anode and cathode chambers, a chemically inert anode in said anode chamber, means for conducting the solution formed in said anode chamber to said iron containing receptacle, and means for treating the solution formed in said iron receptacle with the solution formed in the cathode chamber.

WILLIAM B. BULL.

Witnesses:
JOHN L. JACKSON,
W. H. DE BUSK.